Keith P. Lanneau
James A. Parnell
INVENTORS

Keith P. Lanneau
James A. Parnell
INVENTORS

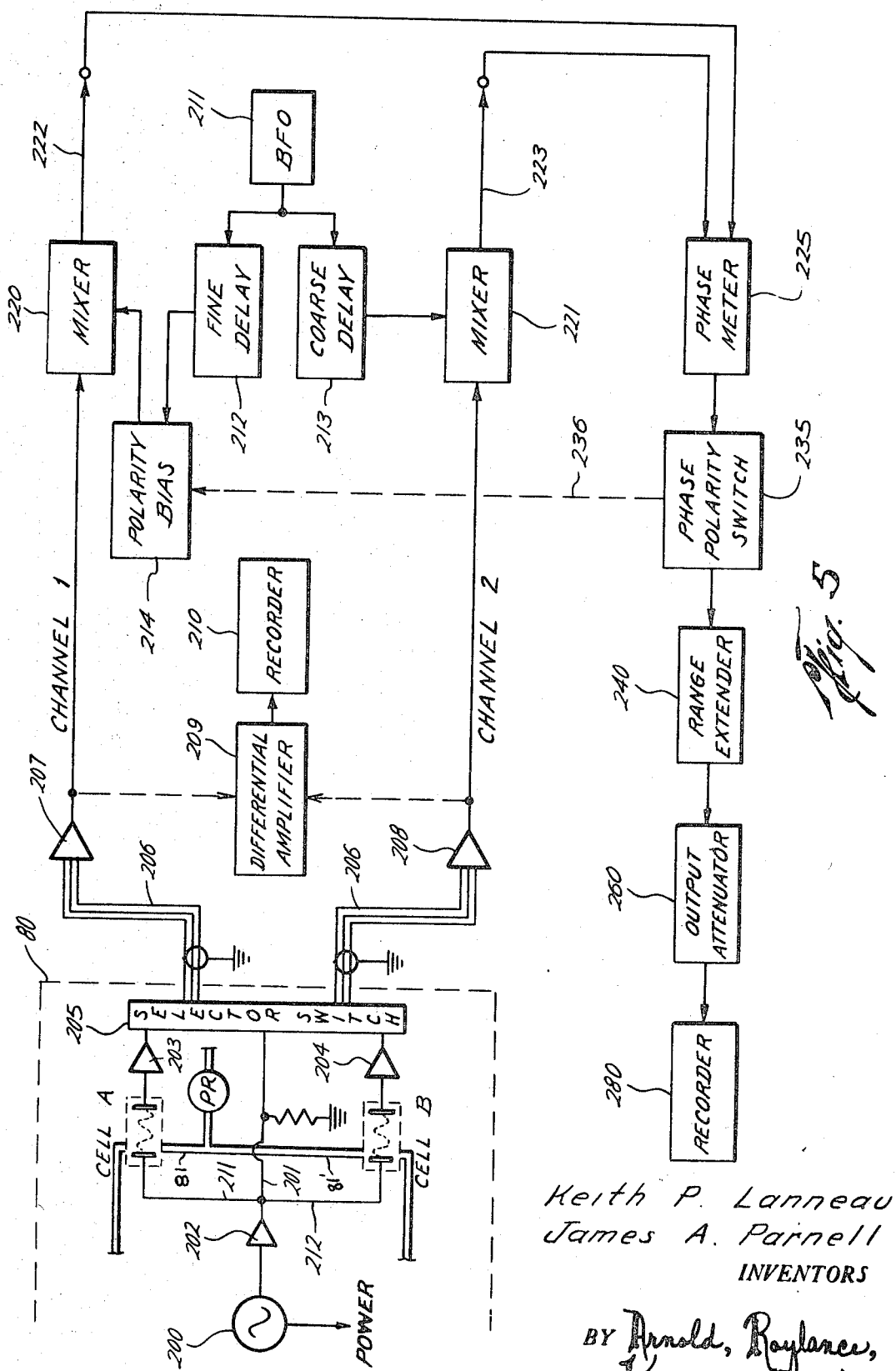

United States Patent Office 3,557,605
Patented Jan. 26, 1971

3,557,605
ULTRASONIC ACOUSTICAL ANALYSIS
Keith P. Lanneau, Baton Rouge, La., and James A. Parnell, Houston, Tex., assignors, by mesne assignments, to Tracor, Inc., Austin, Tex., a corporation of Texas
Filed Mar. 31, 1967, Ser. No. 627,518
Int. Cl. G01n 29/02
U.S. Cl. 73—24
18 Claims

ABSTRACT OF THE DISCLOSURE

A sound cell for analyzing fluids, such as the effluent of a gas chromatograph, utilizes low Q transducers mounted on stems extending into the sound cell which stems have sharp edged frontal retaining lips which make substantially linear contact with the acoustic face of the transducer. The transducers are biased against the lips by springs which also serve as the electrical contact with the transducer. Gas flow through the cell surrounds the transducers preventing a pressure drop across them. Gas flow also serves to sweep the seals of the cells to prevent ingress of foreign material. The cell is utilized in a fluid analysis system together with a drive oscillator and output amplifiers maintained in a controlled temperature environment, and a phase meter capable of recording increments of phase shift in excess of 360°.

BACKGROUND OF THE INVENTION

This invention relates to acoustical analytical detection apparatus and techniques. More specifically, the instant invention provides a novel system for effecting analysis of fluids using ultrasonic acoustical techniques which is particularly adaptable to analyze a gas chromatograph effluent.

Analysis by gas chromatography involves the separation of the various components of an unknown sample by adsorption or partitioning of the sample in a chromatographic column of suitable material, and the subsequent elution of each component of the sample as a pseudobinary mixture with a carrier gas which sweeps each component from the column. The elution sequence of the components from the column depends variously upon volatility, molecular weight, and other properties which effect the adsorption, desorption, and partitioning of these different components upon the column material.

Analysis of this chromatograph effluent is effected by any one of a number of techniques. For example, the effect of each unknown component in the sample upon the thermal conductivity of the carrier gas can be measured. Alternatively, the heat of adsorption of each various component upon a suitable sorptive material such as charcoal can be measured with a thermopile and recorded. However, each of these methods produce outputs which are characteristically nonlinear with respect to the weight concentration of the unknown component. Moreover, in each instance, measurement by these techniques does not involve direct measurement of that property nominally being monitored, and hence introduce coupling variables which must be considered to ensure that the parameter being measured remains in its proper relationship to the ultimate property of the sample to which the analysis is directed. Thus in a thermal conductivity detector the temperature of the hot wire in the sensing cell is only empirically related to thermal conductivity of the gas, and measurement of wire temperature is not a direct measurement of thermal conductivity.

Direct analysis may be accomplished by acoustic techniques wherein the effect of the sample on a sound wave is measured. Acoustical analysis techniques make use of the fact that different substances transmit sound at different velocities. Furthermore, the speed of sound through a gas can be specifically functionally related to the molecular weight of the gas. This relationship derived from the ideal gas law is expressed by Noble et al., "Performance and Characteristics of an Ultrasonic Gas Chromatograph Detector," Anal. Chem., vol. 36, p. 1421 (July 1964) as follows:

$$\text{Velocity} = \left[\frac{YRT}{M}\right]^{\frac{1}{2}}$$

where M is the molecular weight of the gas, Y is the specific heat ratio of the gas, R is the universal gas constant, and T is absolute temperature. Nobel et al. proceed to show that gas mixtures such as are found in the effluent of a gas chromatograph wherein the components of the sample are eluted with a carrier gas similarly effect sonic velocity in a manner fuunctionally related to both the molecular weight and concentration of the components to the mixture.

Measurement of sonic velocity through the gas sample may conveniently be effected by measuring the accompanying phase shift in the acoustic wave which is related to velocity of the wave by the equation:

$$\phi(\text{phase shift}) = \frac{360fs}{V}$$

where V is velocity, $f$ is frequency and $s$ is path length. Since frequency and path length may be fixed in the analysis phase shift for a given gas or mixture through which the wave passes is directly indicative of velocity and accordingly enables analysis of the gas.

In acoustical gas analysis techniques, the gas to be analyzed is passed into a cell, termed herein a sound cell. Acoustical waves generated at one end of the cell are passed through the gas and picked up at the opposite end of the cell. The output wave of this sound cell may then be compared with an electrically generated reference signal or to a signal output of a similar cell containing a known gas to determine phase shift to thus effect the gas analysis. As a gas chromatographic analyzer, an acoustical device is excellent since it can be adapted to compare the phase shift caused by carried gas combined with eluting sample with phase shift caused by carrier alone thus canceling slight impurities in the carrier. Further, acoustic analysis techniques provide a nondestructive analysis which enables wide selection of carrier gas and which further can be made to produce an output signal virtually proportional to the unknown component molecular weight by use of low molecular weight carriers such as helium or hydrogen.

Aside from gas chromatographic analysis, acoustical techniques may be similarly employed for fluid analysis in various other ways. For example, an acoustical detection technique may be employed to monitor a gas stream for the presence of an undesired component. In such a case, deviation of the gas composition would produce a detectable difference in velocity of the acoustic signal and a corresponding phase shift of the sonic wave as an indication of the presence of undesired components. Ultrasonic techniques may also be employed as analytical detectors in liquid chromatography applications as well as in other fluid analyses.

However, despite the obvious advantages of acoustical techniques, they have largely been ignored in the development of analytical instrumentation.

One approach in the prior art has been to measure the phase shift in a kilocycle frequency acoustic signal transmitted through the sample cell. However, the cell path length of devices which utilize signals in the kilocycle range is on the order of about one meter. Cells of such size inevitably necessitate bulky analytical equipment but even more importantly can hardly be employed in gas chromatographic analysis where often it is desired to employ very small samples and limited flow of carrier gas.

The work of Noble et al. above involves the use of a megacycle acoustic signal enabling the shortening of path length. But the techniques developed by Noble did not provide the resolution desired for gas chromatography analysis inasmuch as this prior art system could not attain a phase stability consistent with the desired parts per million resolving power of an analytical chromatograph. The piezoelectric crystal transducers recommended by Noble et al. are extremely frequency sensitive and produce considerable shifts in phase for even minor frequency shifts. Using crystal transducers of the type disclosed by Noble requires superstable drive oscillators having a stability on the order of one cycle per second for an acoustic signal of megacycle frequency to produce even a moderately acceptable phase stability. Commonly available megacycle oscillators having a stability of from 10 to 100 cycles per second would render the apparatus of Noble et al. insufficiently stable for high resolution analyses.

Furthermore, the sound cell of Noble et al. was constructed of plastic to obviate the appreciable sound transmission which was found to have occurred with metal bodies. The use of such materials is undesirable because such materials do not provide long term dimensional stability, and because such materials are permeable to gases and difficult to construct in leaktight gas connections, and because such materials may have temperature limitations as to use and accordingly limit the high temperature operability of the cell.

SUMMARY OF THE INVENTION

It is pointed out that reference in this application to an acoustic signal does not imply audibility of the signal, but rather the term is used to designate that the signals employed to conduct analysis in accordance with this invention are mechanically produced waves of frequencies as disclosed which are transmitted through the fluid being analyzed.

Thus, there is provided by this invention a novel apparatus system for analyzing fluid mixtures using an acoustic signal of ultrasonic frequency. There is also provided by this invention a novel method for analyzing multicomponent fluid mixtures which involves measurement of both the speed and the attenuation of an acoustic signal passing through the mixture.

The instant invention provides an analytical apparatus using acoustical techniques which at once provides a high degree of cell phase stability on the order of ±.003° phase change and consequent high resolution capabilities utilizing components which render the instrument competitive in the analytical field.

The device of the instant invention comprises a novel sound cell containing piezoelectric transducers capable of transmitting and receiving an acoustic signal preferably in the megacycle range, through which cell the gas to be analyzed is passed, and a novel output conditioning system for producing a readout analog signal corresponding to the phase delay history of the ultrasonic signal passing through the sound cell. Of course, phase delay is commonly determined in the output conditioning system by comparing the output of the analyzing sound cell with the output of a reference cell or with a reference signal.

In an initial aspect, the novel apparatus system of this invention provides a novel sound cell wherein transmitting and receiving piezoelectric transducers are mounted on a stem extending into the cell in such a manner as to avoid radial compressive forces on the transducers and to avoid surface loading on the acoustic face of the transducers. This mounting technique provides singular phase stability to the transducers and substantially minimizes the transmission of a parallel acoustic signal through the cell body. The piezoelectric transducers are mounted by biasing the transducer against the sharp-edged retaining lip which makes substantially linear contact against the acoustic face of the transducer.

The novel apparatus system of the instant invention further provides a sound cell employing piezoelectric transducers of low Q value thus enabling the attainment of phase stability in the system over a variety of cell temperatures.

The novel apparatus system of this invention further provides an integrated assembly of sound cell, drive oscillator and isolation amplifiers in temperature-stable environments which enables the generation and pickup of a phase-stable acoustic signal through the cell.

The novel apparatus of the instant invention further provides a novel output conditioning circuit which produces continuous analog output corresponding to the phase delay history of the analyzing acoustical wave without producing foldovers. Phase meter output corresponding to phase delay is fed to a phase range extender which increases dynamic range of the output recorder and enables generation of single peaks corresponding to phase delays in excess of 360° phase shift.

A novel method in accordance with this invention provides a procedure for analyzing a multicomponent fluid mixture by transmitting an acoustic signal through the fluid and measuring phase shift of the signal caused by the fluid as indicative of the speed of the signal through the fluid, and also measuring the attenuation of the amplitude of the signal caused by the fluid. Thus, two conditions related to the composition of the fluid may be simultaneously measured and recorded affording basis to resolve more than one unknown in the sample.

BRIEF DESCRIPTION OF THE DRAWINGS

The instant invention will be more particularly understood with reference to the specific embodiments illustrated in the accompanying drawings.

FIG. 5 is a block system diagram of the analytical system of the entire analytical system in accordance with this invention.

DESCRIPTION OF SPECIFIC EMBODIMENTS

Figure 1:
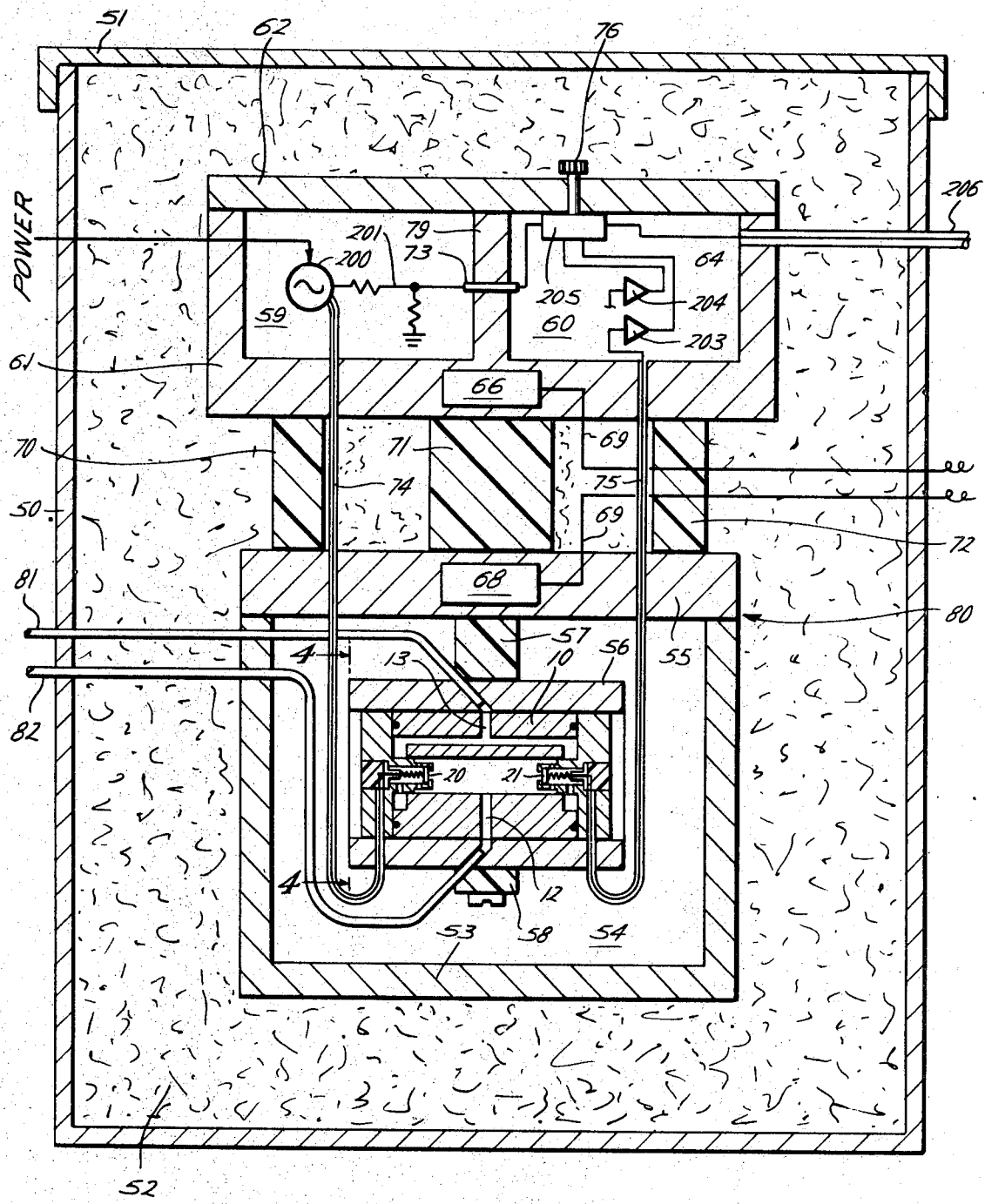
FIG. 1 is a sectional view of the constant temperature analytical header assembly showing a sound cell with the fluid conduits and electronic leads connected to the cell.

The embodiments of the instant invention issustrated in the accompanying drawings are generally designed for use in a gas analysis system such as with a gas chromatograph. However, it is pointed out that although reference will be made herein to embodiments illustrated in the drawings, the instant invention is not limited to analysis of gases nor to analysis of chromatographic effluents.

The sound cell

Figure 2:
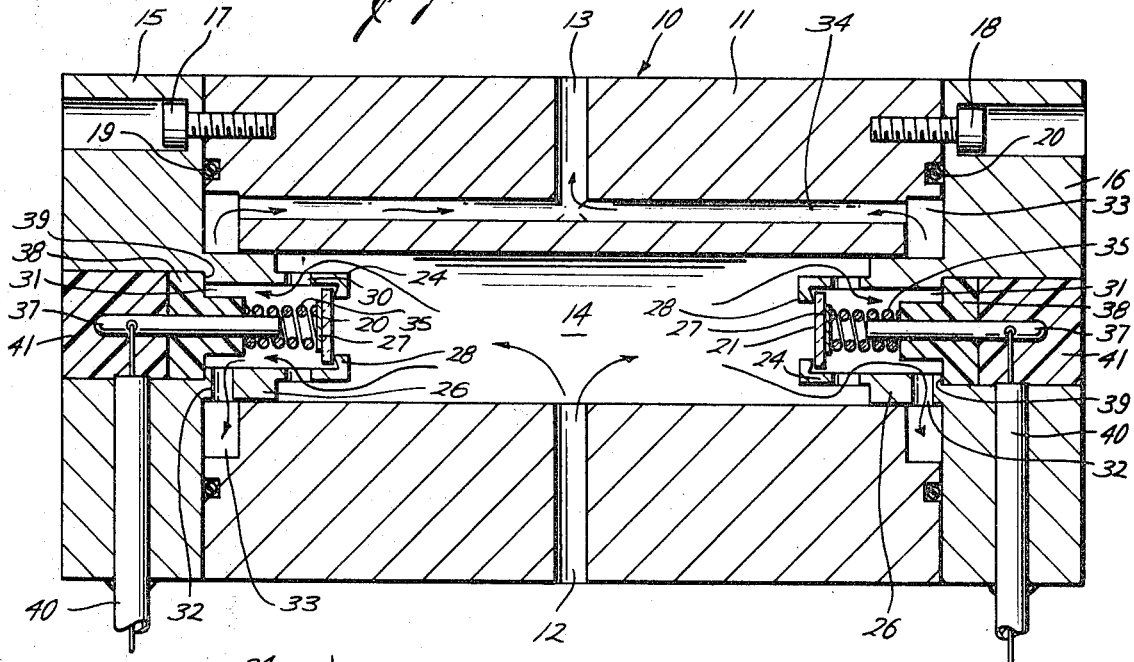
FIG. 2 is an enlarged cross-sectional view of a sound cell in accordance with this invention having the gas flow path through the cell indicated with arrows thereon.

With reference now to FIG. 2, there is shown in sectional view a novel sound cell 10 in accordance with this invention. Sound cell 10 is composed of cylindrical cell body 11 having an axial circular cavity 14 sealed at each end with end pieces 15 and 16. The end pieces are suitably secured to cell body 11 by means of screws such as 17 and 18 which upon tightening compress silicone rubber O-rings 19 and 20 to effect a gas-light seal of inner cavity 14 from outside atmosphere. Other types of gasket sealing may be employed as will be appreciated by those skilled in the art. It is readily seen that the cell design permits ready alteration of the cell path length by replacement of a cell body 11 with a suitable cell body of different axial length.

Cell body 11 is provided with inlet port 12 and outlet port 13 together with end channels described hereinafter to split the inlet gas flow and provide for mirror image flow patterns of gas in both sides of the cell. In view of the mirror image character of the cell in this disclosure, one designating number shall be employed to indicate the same piece at both ends of the cell in the drawings.

Matched piezoelectric transducers, transmitting transducer 20 and receiving transducer 21, are mounted in reduced diameter portions 24 of transducer mounting stems 26 so as to be axially aligned at opposite ends of cavity 14. The transducers are identical, and reversal of their transmitting and receiving functions may be effected merely by reversal of the input and output connections. The transducers have matched resonant frequencies so that an input to the transmitting or drive transducer generates an acoustic wave which induces an output of similar frequency in the receiving transducer. The transducers employed in accordance with this invention are piezoelectric transducers, for example, of the ceramic or crystal type, capable of generating a mechanical force or sound wave upon excitation at or near the transducer resonant frequency, and of producing a voltage in response to the mechanical force of such a sound wave. A thin metal film in the form of a spot 27 formed directly on the rearward side of each of the transducers serves as the transducer electrode, while a like metal film across the front or acoustic face of the transducer serves to make ground contact against the mounting lip 42. These metal films are of gold, silver, or the like and are deposited on the transducer surface by any one of various methods such as evaporation or the like. In the drawings, gold spots 27 on rearward side of transducers 20 and 21 are shown as having a discernible thickness for purposes of illustrating how contact with springs 35 is made. The films are of minimal thickness and hence the film across the acoustic face 23 of the transducer is not illustrated as a thickness.

Transducers 20 and 21 are mounted in a unique manner in the forward reduced portion 24 of mounting stems 26. The mounting of the transducers in accordance with this invention has been found to greatly enhance the stability of their resonant frequencies and also to virtually eliminate spurious sound transmission through the cell body. Accordingly, this design enables the construction of an all-metal cell from stainless steel or the like. Each transducer is biased by spring 35 against sharp-edged retaining lip 28 in the front of the reduced diameter portion 24 of the mounting stems. No sealant or cement need be employed to hold the transducer in place. The contact on the acoustic face 23 of the transducers, i.e., the face exposed in the sound cell for generating or receiving the acoustic signal, is substantially a linear contact as may be more clearly seen in FIG. 3. The pointed inner edge of retaining lip 28 engages the acoustic face of the transducer along a line extending around the transducer proximate the periphery thereof. Similar mounting of the transducer, even without cement or sealant, in an edge mounting where the retaining lip is flat so as to bear against an area (for example a mounting as in FIG. 3 where angle $\alpha$ is zero) has been found to result in erratic transducer performance and also at times slight chipping of the transducer edge. Such minute flaws at the outer periphery of the transducer face have been found to produce a considerable change in the resonant frequency and attendant difficulties.

Figure 3:
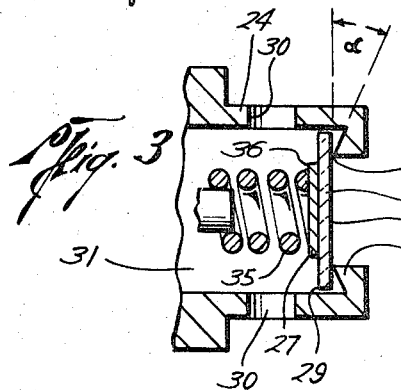
FIG. 3 is a further enlarged view showing the detail of the piezoelectric crystal transducer mounting in the sound cell.

In accordance with the novel cell design of the instant invention, the piezoelectric transducers are mounted with a bias against a sharp edge engaging the transducer periphery. It should be mentioned that for purposes of illustration, the accompanying drawings show retaining lip 28 to be considerably larger in proportion to transducer size than would actually be employed. Indeed it is desirable to have the edge of the retaining lip engage the outermost portion of the acoustic face. The transducer mounting may suitably be effected as shown in FIG. 3 providing a sharp bearing edge 42 for making linear contact around the acoustic face 23 of the transducer as by providing a receding surface in the inner side of the retaining lip which defines an angle $\alpha$ of about ten to twenty-five degrees with the acoustic face of transducer 20.

In addition, the transducer should be mounted to avoid radial compressive stresses on the transducer and accordingly clearance 29 is provided between the transducer and the wall of the reduced portion 24 of the mounting stem. Here again for purposes of illustration, the amount of clearance shown in the drawings is for purpose of illustration and is not intended as an accurate scale representation. Clearance need be minimal and only sufficient to relieve any radial compressive stress to the crystal.

A spring 35 bears against the spot electrode 27 on each transducer on the rearward or "electrode" side of each of the transducers. The spring 35 provides both electrical contact with the transducer electrode and also serves to bias the transducer against the sharp edge 42 of retaining lip 28, thus electrically grounding the metal film on the acoustic face of the transducer to the cell which shares a common ground with the drive oscillator discussed hereinafter. The surface of spring 35 contacting the spot electrode is ground flat at 36 to bear uniformly against the transducer and make good electrical contact with spot 27. The amount of spring compressive force on the transducer has been found to have little effect on transducer performance. Increasing spring compression from essentially zero to as high as twenty grams produced only a minor alteration of transducer resonant frequency and otherwise did not deleteriously effect transducer performance. Use of a measured amount of spring force is desirable since such force renders the transducer mechanically stable and nonresponsive to jars or movement of the entire apparatus.

Electrical contact with springs 35 is accomplished at each end of the cell with contact rods 37 which are mounted in plastic insulative mounts 38 which rest on a shoulder 39 in the transducer mounting stems 26. Contact rods 37 are electrically connected to either the drive oscillator or output amplifiers as will be discussed hereinafter depending upon the transducer function. Coaxial cables 40 connecting with contact rods 37 are suitably shielded to protect both the input and output signals of the sound cell from distortion and interference. Potting compound 41, such as a silicone rubber or the like fills the cavity around each contact rod and completes the insulative protection thereof. High temperature ceramic feedthroughs may be used in place of mount 38 and potting compound 41 to provide a high temperature cell.

The reduced portions 24 of the transducer mounting stems 26 are provided with gas ports 30 which permit gas flow in the cell to flow behind both transmitting and receiving transducers 20 and 21. Accordingly, the cell may be operated at elevated pressures without danger of transducer movement or breakage since the pressure on both sides of the transducer is equal. Flow of gas through ports 30 is sufficient to eliminate diffusion of gas back into the analytical cavity 14.

Referring again to FIG. 2, arrows indicate the general flow path of the gas entering cell 10. The gas enters through inlet port 12 and splits traveling toward each end of cavity 14. This split flow eliminates any Doppler effect upon the acoustic signal during analysis as a result of gas flow velocity. At each end of cavity 14 the gas passes through gas ports 30 in the forward portion of transducer mounting stems 26 and flows into the space 31 within each stem behind the transducer. At each end of the cell, gas then flows out of space 31 through passage 32 in the stem into circular channel 33. Circular channel 33 extends entirely around the periphery of the upper portions of transducer mounting stems 26 for forming a purge channel. Any foreign gases which might diffuse between end plates 15 and 16 and cell body 14 past O-rings 19 and 20 will be immediately swept out of the cell and away from the area where analysis is proceeding. Despite the closeness of the seal between end plates 15 and 16 and the cell body 11 diffusion of gases after long periods through the seal is possible. Due to the extreme sensitivity of this analyzer device even the slightest amount of foreign gas in the cell can disrupt an analysis.

The gas flow from circular channels 33 then passes into lengthwise channel 34 which recombines the gas streams from the ends of the cell to pass the stream out exit port 13. It should be noted in the design that passageway 32 to the circular channel is located on the side of the cell opposite lengthwise channel 34. Thus flow out of passageway 32 into circular channel 33 will split and flow around both halves of the circular channel to ensure a complete gas sweep of the circular channel and immediate purging of any foreign matter diffusing through the seal.

The flow pattern of gas through the novel cell of this invention provides a ready ability to control pressure throughout the cell by means of, for example, a back pressure regulator on the gas line from exit port 13. In gas chromatographic analysis where commonly two analyzing cells are employed one with carrier gas and eluting sample and one with carrier gas alone, the back pressure regulator will preferably receive the combined gas outlet from both the measuring cell and the reference cell to provide equal pressure in each as will be discussed below. Furthermore, the cell design permits plug flow through the cell so that a peak surge of an unknown component of the sample which exits the chromatograph is preserved during passage through the cell, and that peak may accordingly be further analyzed in another instrument.

The design of the instant sound cell permitting operation of the cell at elevated pressure gives the cell additional versatility. Elevated pressure operation is preferred since higher pressures improve the coupling between the transducers in the cell and the gas improving the efficiency of the translation of electrical energy to mechanical energy (in the form of an acoustical signal) and the retranslation of the mechanical energy to electrical energy. Thus, when using an acoustic signal of megacycle frequency which can be highly attenuated, even over short cell path lengths of less than an inch, increase of pressure in the cell can provide sufficient coupling to provide an adequate sound level through the cell. Normally, attenuation increases as the molecular weight of the fluid in the cell increases. Thus, for example, the sound level obtained by operation at, for example, 30 to 35 pounds per square inch with helium under given conditions of path length and signal input, would not be obtained if nitrogen or argon were used as carriers unless cell operating pressure was increased to the range of about 50 to 60 pounds per square inch.

Mounting the piezoelectric transducers in the manner disclosed above has the effect of greatly increasing the effective mechanical Q of the transducers when compared to mounting procedures employed in the prior art. For example, mounting of a quartz transducer having a resonant frequency of about 6 megacycles in the transducer mount of the instant invention provides an effective mechanical Q for the transducer between about five and ten thousand. A similar transducer mounted with surface loading of the acoustic face or by cementing the transducer in place in a mount results in an effective mechanical Q in the range of 100 to 500. Of course, these latter prior art mounting methods also produce large nonreproducible shifts in the transducer resonant frequency.

It is now possible to show from purely theoretical considerations that transducers having high Q factors combined with standard crystal drive oscillators having a frequency stability of 10 cycles per second or more, are not able to achieve phase stability less than about ±0.1° phase. Even if a superstable oscillator having stability of one cycle per second at 6 megacycles were employed, a phase instability significantly higher than the ±0.003° phase stability desired in the instrument of this invention would result. Of course, drive oscillators having stabilities in the range of one part in $10^{-8}$ or even one part in $10^{-10}$ are available but only at a considerable expense. Accordingly, use of a high Q transducer is undesirable in a commercial analytical instrument.

In addition to the more serious phase stability problem of high Q quartz transducers, there is a secondary problem. Commercial tolerances on quartz transducers are no better than ±1%. At 6 megacycles, this corresponds to 60 kilocycles which is 50 to 100 times the usable band width. It is accordingly not possible to obtain a very high yield of transducers whose resonant frequencies will be within one kilocycle of an operating frequency in the megacycle range.

Unlike quartz and tourmaline, the two most used natural occurring crystalline piezoelectric materials, ceramic piezoelectric transducers are characterized by low mechanical Q's. Their activity in general is much higher than the natural material. The principal artificial materials are ceramic composites of barium titanate or composites of lead titanates and lead zirconates. They are produced by conventional ceramic casting and firing techniques and are polarized by placement in a high DC electric field as they are cooled from an elevated temperature.

These ceramic transducers are characterized by effective mechanical Q factors in the general range of 50 to 100. Use of transducers having a Q within this range enables use of a standard drive oscillator having an oscillator stability in the range of 10 to as high as 100 cycles when operating in the megacycle range while still providing the desired ±0.003° phase stability desired in the analysis instruments of this invention.

Low Q piezoelectric transducers are not characterized by significant changes in amplitude of output when excited at a frequency slightly different from the transducer resonant frequency. However, transducers with high Q factors fall off very rapidly in output amplitude as the exciting frequency departs from the transducer's resonant frequency. Thus, to maintain an adequate sound level through the cell at a reasonable power level, it is again necessary that a frequency-stable signal be employed to drive a transducer of high Q factor.

To maintain an adequate sound level through a cell employing high Q transducers, the frequency stability of the drive oscillator must be sufficiently stable to maintain the drive signal at or close to the resonant frequency of the transducer. Since this cannot be effectively assured with other than superstable oscillators, the use of a standard oscillator of necessity requires a boost in transducer input voltage to assure that sound level will be maintained despite departure from resonant frequency. Thus, use of high Q transducers in a commercial instrument implies that high inputs to the transducer be used. These high voltage inputs can result in spurious, nonpredictable and nonreproducible heat effects which can adversely effect accuracy of the analysis. On the other hand, the more uniform amplitude out of low Q transducers at frequencies removed from resonance enables the maintenance of a sufficient sound level despite oscillator frequency variation. Thus, in practice, whereas a high Q transducer may require 50 volts to maintain an adequate sound level over the oscillator frequency range, a low Q transducer will require only a 10 volt input.

Furthermore, temperature changes in the cell change transducer resonant frequency thus shifting the resonant frequency of a high Q transducer away from the exciting frequency of the oscillator used. This shift can be sufficient to seriously effect amplitude and noise level; and accordingly, in general, high Q piezoelectric transducers may only be used over short temperature ranges without modifying the drive oscillator to the new resonant frequency, as by changing the oscillator crystal. The rather gradual decrease in amplitudes of transducers with low Q factors at frequencies removed from resonant frequency, enable such transducers to produce adequate sound level over wide temperature ranges. Thus, a ceramic transducer having a Q of about 50 to 100 and having a resonant frequency of 6 megacycles at 125° C. could be employed at cell temperatures ranging as low as 75° C. to 175° C. A range of this breadth cannot be accommodated by a high Q factor transducer such as quartz.

Accordingly, the instant novel invention also provides a preferred novel sound cell wherein ceramic piezoelectric transducers having Q factors in the range of about 100 or less are employed in the novel cell design and mounting technique. Employing the novel transducer mounting technique of the instant invention, use of low Q transducers enables achievement of a sound cell having a phase stability in the range of thousandths of a degree phase without resort to expensive superstable drive oscillator mechanisms.

It is pointed out, however, that the novel transducer mounting technique of the instant invention may be employed with high Q transducers as well as with low Q ceramic transducers. With transducers of both types, the novel sound cell design using this mounting technique substantially eliminates sound transmission through the cell and accordingly enables construction of all-metal sound cell. Usually, noncorrosive stainless steel or the like is employed in the novel cells of this invention. Further, the novel transducer mounting technique of this invention enables operation at high pressures in the cell and moreover does not produce significant shifts in the designed resonant frequency of the transducers employed.

For stable operation of a novel cell in accordance with this invention, the sound level through the cell must in general be sufficient to produce an output of at least one millivolt in the output transducer. At a given operating frequency and with a given gas in the cell, the controllable variables in the sound cell which effect sound level are drive voltages to the transmitting transducer, cell path length, and cell pressure. Since the selection of drive voltage is limited to voltages which do not heat the driving transducer excessively to cause spurious heat effects and instability in the sound cell, adequate sound level through the cell is generally achieved by shortening cell path lengths and/or by increasing operating pressure to improve coupling. In general, cell path lengths below about one-eighth inch at 6 megacycles may require a reduction of cell diameter or an angular offset of the transducers out of parallel to prevent excessive reflective waves which can cause error. Nitrogen, argon and oxygen operate effectively as carrier gases using a 6 megacycle signal at pressures of 50 to 60 pounds per square inch absolute over a cell path length of about one-half inch. Helium transmits adequate sound over a one inch path at pressures of 30 pounds per square inch. It has been found that a 6 megacycle signal operates most efficiently with helium and is good with other gases, and hence this frequency is exemplified often herein. Hydrogen highly attenuates a 6 megacycle signal, despite its low molecular weight, presumably due to a molecular asborption band of this diatomic gas in the region of 6 megacycles. Thus, operation at 6 megacycles with hydrogen must be carried out over a shorter path length of about a one-quarter inch path length or at higher pressures of about 80 to 90 pounds per square inch absolute at a path length of one-half inch. If desired, of course, the oscillator may be altered to a different frequency to accommodate hydrogen. In this regard, it will be appreciated that since the attenuation of an acoustic signal in a gas increases with the square of the frequency, that the chosen frequency of operation will also be determinative of the cell variables to obtain adequate sound level.

The above operating conditions are set forth for purposes of example only, and in no way are considered to limit the instant invention as to operating signal frequency range, carrier gases, or the like. Indeed, sound cells in accordance with the instant invention may be employed in liquid chromatographic applications wherein attenuation of the sound wave through the sample is not as serious a problem and wherein signals in the range of 20 megacycls may be desirably used. Also, kilocycle signals may be desired to effect the analysis in which event sound attenutation again is not a serious problem. The cell path length would generally be longer than exemplified above.

Furthermore, the novel sound cell of this invention is not restricted in its utility to acoustic systems where a measurement of phase differentiated is effected to measure the speed of an acoustic signal. For example, the novel sound cell of this invention may be employed in an overall system in which sound speed is measured by the "ring around" technique. This method involves energizing the input or drive transducer with an RF pulse of short duration. The pulse travels through the gas to be analyzed and is received at the receiving transducer and the received pulse triggers the next drive pulse to the drive transducer. Therefore, the frequency at which the entire cir- is pulsing is dependent on the speed of the pulse through the fluid being analyzed. Thus, a measurement of speed through the fluid in the cell is effected. The novel cell of this invention is readily adaptable to such a system. Of course, in such a sound cell, high energy pulses could be fed to the drive transducer without serious concern for spurious heating since the duty cycle of the pulsing transducer, i.e., "on" time to "off" time, is so short, and consequently adequate sound level would be provided using longer path lengths.

Thus, despite the precise function support electronics system, the novel sound cell of this invention provides an apparatus having heretofore unavailable advantages which may be utilized in various types of analyses wherein effects produced on an acoustic signal by a fluid are sought to be measured.

The electronic header assembly

Referring now to FIG. 1, there is shown the analytical header assembly wherein the sound cell and several of the electronic components are mounted in a temperature-stable environment.

Outer container 50 provided with lid 51 is filled with fibrous insulation 52 supporting and surrounding the analytical header assembly 80. The analytical header assembly is composed of a lower thick-walled metal container 53 such as of aluminum having lid 55 affixed thereto. The entire container is kept at a desired temperature by means of temperature controller 68 which, for example, can comprise a resistance thermometer sensing device and a resistance heater to monitor and maintain the temperature. Wire 69 leads from temperature controller 68 out of container 50 to enable temperature control.

Figure 4:
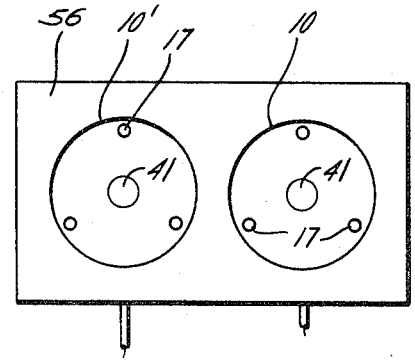
FIG. 4 is a plan view of two sound cells in a heater block taken along line 4—4 in FIG. 1.

The lower aluminum container encloses stagnant air bath 54 which surrounds the sound cells 10 and 10' enclosed in an aluminum heat sink block 56. The sound cells 10 and 10' are horizontally arranged in the heater block as may be more clearly seen by specific reference to FIG. 4. In FIG. 1, sound cell 10' is not shown since it is disposed behind sound cell 10. For rapid temperature equilibration, heater block 56 mounting the sound cells might also be thermostatically controlled, though this would cause short term temperature to suffer. The mounting of two sound cells in the same aluminum heat sink block 56 improves control of both cells 10 and 10' to enable their operation at the same temperature. Heat sink block 56 is mounted within stagnant air bath 54 by means of insulative mounts 57 and 58. Accordingly, there is no conductive heat path from the heat sink block 56 to another heat conductive member.

Inlet gas conduit 82 extends from the gas chromatograph or other source of sample to be monitored into the cell inlet port 12. The gas circulates through the cell as discussed above and passes out cell exit port 13 through line 81 to exhaust or to another instrument for purposes of conducting further analysis. Of course, cell 10' located behind cell 10 in FIG. 1 is also provided with gas inlet and outlet conduit arranged similarly to the conduit functioning with cell 10. In differential analysis wherein one cell is employed as a measuring cell, and the second cell is employed as a reference cell, it is desirable to equalize pressure in the cells by combining the outlet lines such as 81 and 81' (FIG. 5) from both of the cells and placing a back pressure regulator PR on the combined line. The pressure backup caused by the regulator will accordingly equalize the pressure in both the reference and measuring cells.

Located above container 53 and separated therefrom by insulating blocks 70, 71, and 72 is a second thick wall bicompartment metal container 61 having thick-walled lid 62 thereon. Container 61 constructed of aluminum or the like is temperature controlled independent of container 53 by means of controller 66 controlled through wire 67. Container 61 serves to enclose several of the electronic components and maintain them in a temperature-stable environment. In general, although cells 10 and 10' may be operated over a wide range of temperature extending as high as about 300° C. or higher, the stagnant air baths 59 and 60 within container 61 are generally maintained at just slightly higher than ambient temperatures, for example, about 70° C. or the like. The temperature control in container 61 need not be as accurate or sensitive as temperature control in the lower container inasmuch as changes of several degrees will not result in substantial difference of performance in the electronic components and a temperature constantly maintained within a 5° range provides sufficient stability.

In the left-hand compartment of container 61 as shown in FIG. 1, there is provided drive oscillator 200 adapted to drive transmitting transducer 20 through cable 74. Cable 74 is preferably a rigid coaxial cable between containers 53 and 61 and is sufficiently shielded to prevent outside interference with the oscillator signal passing through the cable. Also provided from oscillator 200 is wire 201 extending directly to selector switch 205 to enable comparison of the signal of either cell directly with a reference electronic oscillating signal as will be hereinafter discussed. Drive oscillator 200 may be employed with a drive amplifier such as shown at 202 in FIG. 5. Any suitable oscillator may be used to provide the desired peak-to-peak maximum voltage and the desired frequency signal in either the kilocycle or megacycle range.

The right-hand compartment in container 61 houses isolation amplifiers 203 and 204 in a stagnant heat bath 60 which amplifiers receive the output signal from the receiving transducers of cells 10 and 10', respectively. Wall 79 between the compartments of container 61 serves to shield the amplifiers from interference from the drive oscillator 200. Isolation amplifiers 203 and 204 are preferably connected to the receiving transducers by means of rigid coaxial cables such as shown at 75 which are properly shielded. It is important that cables 74 and 75 be rigidly mounted between containers 53 and 61 and properly shielded inasmuch as small movements of these cables can result in a change in capacitance causing a phase shift in the input or output signal thus causing distortion in the analysis. In general, cables 74 and 75 are enclosed in stainless steel tubes or the like in the region between container 53 and container 61 to ensure that movement of the cables does not occur.

Isolation amplifiers 203 and 204 are in turn connected to selector switch 205 to enable comparison of any desired signals as will be hereinafter explained. As mentioned above, the signal at the receiving transducers generally on the order of one or two millivolts and accordingly, isolation amplifiers 203 and 204 perform an impedance matching function to drive output cables such as 206 from selector switch 205. If desired, these amplifiers may also be employed to take a voltage gain upon the output signal. The output cables are preferably shielded coaxial cables to conduct the output signal from the analytical header to the remainder of the output conditioning system which is located remotely of the header.

Temperature control of the environments of the amplifiers and the drive oscillator promote the consistent and stable performance of the amplifiers. The header assembly of the instant invention which provides separately controllable temperature-stable environments to both the drive oscillator and the output amplifiers combined with the novel cell design discussed above, provide an extremely phase-stable analytical instrument which achieves phase stability on the order of ±0.003°.

Output conditioning circuitry

Referring now to FIG. 5, there is shown in block diagram fashion the entirety of an analytical system in accordance with this invention in one embodiment.

The oscillating signal output of driving oscillator 200 is fed through an input amplifier 202 if desired and is fed through lines 211 and 212 to the sound cells, schematically illustrated as Cell A and Cell B in FIG. 5. As stated above, one cell may be employed as a measuring cell with carrier gas and sample components passing through it, and the second cell may be employed as a reference cell with only carrier gas passing therethrough to cancel out any variations due to small impurities in the carrier, and to compensate for minor temperature changes of the cell compartment 53. The output signal from each Cell A and Cell B is fed through isolation amplifiers 203 and 204 to selector switch 205. In addition, the reference signal directly from input amplifier 202 may be fed through line 201 to selector switch 205. Selector switch 205 enables comparison in the subsequent circuitry of either the output of Cell A with the output of Cell B as a reference, or compare the output of Cell A or the output of Cell B with the reference signal directly from the oscillator in line 201. All of the components up to the selector switch are enclosed in the analytical header assembly 80 designated on FIG. 5 by a dotted line.

Coaxial cables 206 from selector switch 205 transmit the two signals to be compared for phase difference to amplifiers 207 and 208. FIG. 5 designates the output of amplifier 207 as Channel 1 output and the output of amplifier 208 as the channel 2 output. Immediately following the amplification of the signals in both the Channels 1 and 2, there may be optionally inserted in the system differential amplifier 209 which compares the amplitude of the signals in Channel 1 and Channel 2 and feeds the difference in amplitude to recorder 210, for example, a strip recorder, to make a permanent record of this amplitude differential. Since various gases in the cells may cause different attenuation of the acoustic signals passing through the cell, the use of a differential amplifier at this point senses a second condition in addition to the phase shift which condition is related to the composition of gas in the cell. Accordingly, use of the differential amplifier at this point can enable resolution of a mixture in the cell of more than one unknown component and provides a novel analysis technique.

In accordance with the preferred method of operation of the novel apparatus of this invention, a megacycle signal is employed in the sound cells. However, it is extremely difficult to develop circuitry to detect a phase shift between two signals having a frequency in the megacycle range. Accordingly, beat frequency oscillator 211 is provided to be used in those instances where there is a megacycle output from amplifiers 207 and 208. The beat frequency oscillator serves to "beat down" the frequency in Channels 1 and 2 to the kilocycle range. For example, a 6 megacycle signal output from amplifier 207 and 208 will be beat down to a frequency in the kilocycle range, e.g., 1 or 2 kilocycles by beat frequency oscillator 211. The coarse delay 213 and fine delay 212 controls on the beat frequency oscillator enable setting of the signals in Channel 1 and Channel 2 a desired amount out of phase to provide a phase offset between the channels. If indeed the signals in Channel 1 and Channel 2 were precisely in phase, the slightest fluctuation in either signal would cause the subsequent circuitry to sense essentially zero phase shift and 360° phase shift and produce greatly oscillating output readings. Accordingly, the signals in Channel 1 and Channel 2 are offset in phase slightly, e.g., by about 5°, prior to the passage of any sample components through the sound cells. Any further phase shift which is caused by an unknown sample in the cell can be measured from this initial phase offset.

The output from the fine delay 212 is fed to polarity bias circuit 214 which enables the analyst to control the output of the circuitry to always produce an increasing voltage signal through the circuit such that positive peaks may always be recorded on the recorder if such is desired. This circuit will be more explicitely discussed hereinbelow.

The beat frequency from beat frequency oscillator 211, after being delayed as desired through fine delay 212 and coarse delay 213 to provide the desired phase offset between Channel 1 and Channel 2, is fed into mixers 220 and 221 wherein the beat frequency beats down the megacycle input to the mixers to produce a kilocycle output in lines 222 and 223. It is pointed out here that the beating down of the Channel 1 and Channel 2 outputs of amplifiers 207 and 208 need not be provided in an analytical instrument where a kilocycle signal is employed in the cells.

Figure 6:
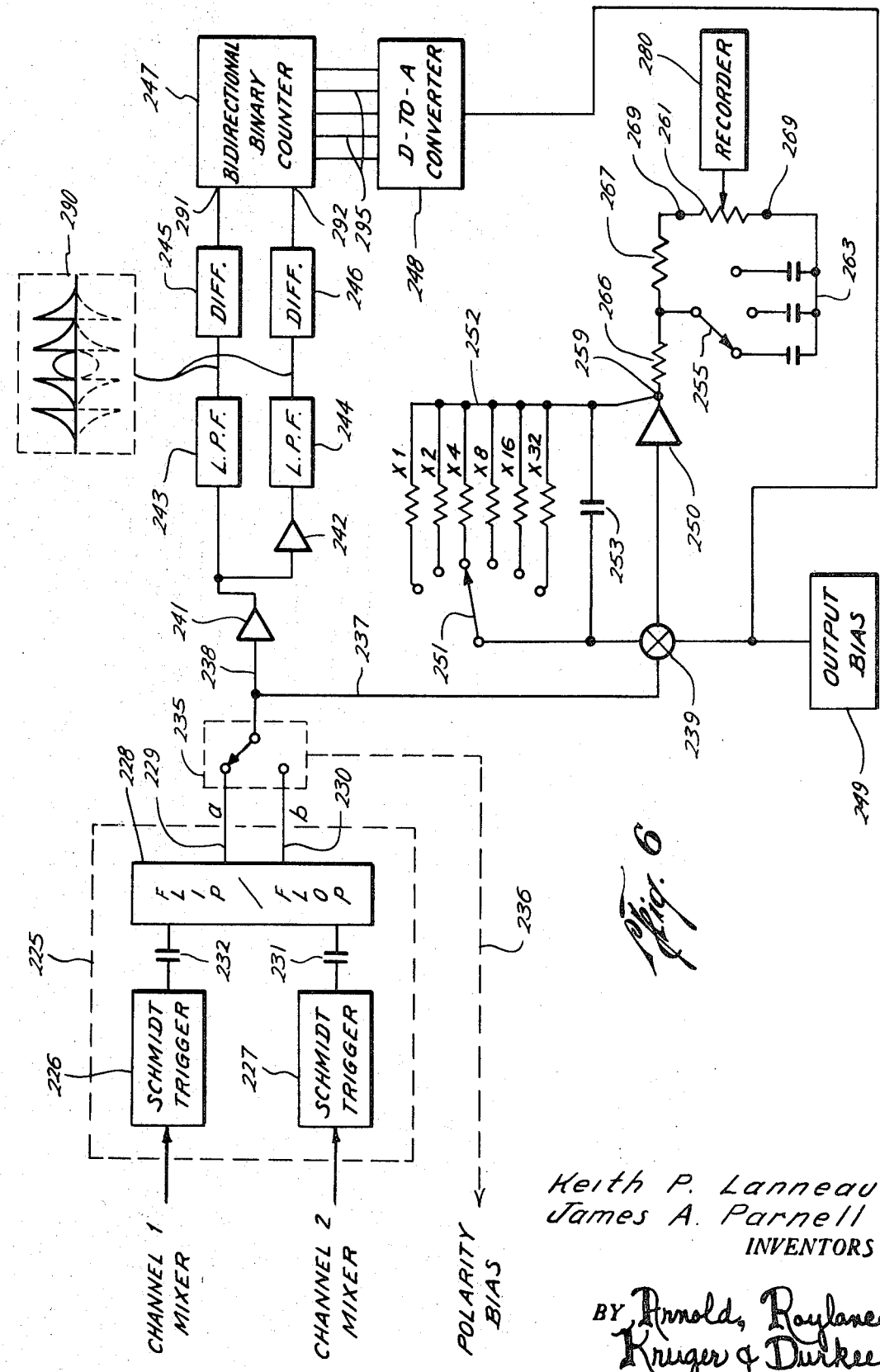
FIG. 6 is a partially schematic diagram of the output conditioning system employed in the instant invention.

The outputs of the Channel 1 and Channel 2 mixers are then fed to phase meter 225. With specific reference to FIG. 6, the components of phase meter 225 are shown in block diagram form within the dotted outline. The phase meter of the instant invention is a superstable device which, consistent with the phase stability design criterion of this apparatus, provides a simple and efficient method to provide measurement of phase difference between the mixer outputs. The phase meter is a combination of two types of circuits, commonly known as Schmitt triggers and flip-flops. The input from one mixer is fed into one Schmitt trigger 226 while the Channel 2 mixing output is fed through Schmitt trigger 227.

The two Schmitt triggers are bistable devices which are "on" or "off" depending upon whether positive or negative voltage is applied to the input. The hysteresis in these particular circuits is very low so that a change of only a few millivolts input produces a change of state of the output. Thus when the two sine waves from the Channel 1 and Channel 2 mixers are connected to the inputs of these Schmitt triggers, square waves are produced at the outputs with the switching occurring at the zero crossings of the sine waves.

These square waves are now effectively differentiated by means of capacitors 231 and 232 producing narrow spike pulses of alternating polarity occurring at 180° increments in each channel. The negative pulses of each are routed to the flip-flop in such a way that the pulses from one channel turn the flip-flop "on" while those from the other turn it "off." Therefore, the duty cycle of the flip-flop, i.e., the ratio of "on" time to "off" time is equal to the phase difference between the positive zero crossings of the two sine waves. This on-off signal may then be averaged by means of a filter within the flip-flop 228 to produce a DC signal proportional to the phase difference at the outputs 229 and 230 of the phase meter 225.

Figure 7:
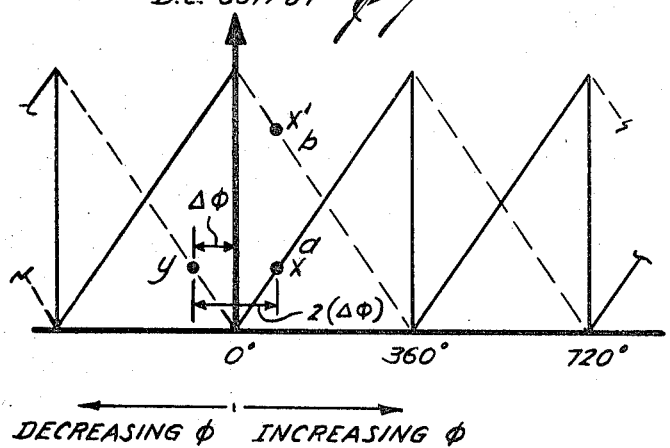
FIG. 7 is a graphic illustration of foldover effect which results from phase shifts of greater than 360°, with notations thereon for illustrating the function of the polarity bias circuit in the output conditioning system.

The DC output of phase meter 225 is a linear function of phase difference as the phase shift proceeds from zero to 360°. Obviously, over this range, the duty cycle of the flip-flop varies from zero to 100%. But phase meter output is discontinuous at 360° phase shift. Any increase in phase shift past the 360° point causes the output of the phase meter to jump back to zero while continuing increases in phase shift beyond 360° result in a repeat of the response of the previous 360° increment. In this regard reference may be had to FIG. 7 in the accompanying drawings. Line $a$ is a graphic illustration of the DC output of terminal $a$ of the phase meter. Since terminal $a$ represents the output of one-half of the flip-flop, the output from terminal $b$ corresponding to the output of the other half of the flip-flop is precisely complementary to the output of terminal $a$ as shown by line $b$ in FIG. 7. It can further be seen that the output of the phase meter increases linearly with increasing phase shift until a 360° phase shift is achieved at which time the DC output of the phase meter jumps back to zero. As phase continues to increase, a repetitive output for each 360° of phase shift is accomplished. For decrease in phase, graph is read from right to left to indicate phase meter response.

Of course, the description of the operation of the phase meter 225 above is completely valid only if the switching times of triggers 226 and 227 and flip-flop 228 are instantaneous. Clearly, any finite switching time in any part of the circuit causes error. Further, if these switching times are time-variant, noise in the output is produced. Thus, it is highly desirable that all switching times be minimized and made as small a percentage of the total cycle time as possible. Standard components as disclosed perform switching at sufficient speed to preserve the sensitivity and accuracy of the system.

The output of the phase meter is then routed to a polarity switch 235 which enables selection of the desired output, i.e., the output from terminal $a$ or terminal $b$. Since ordinarily in analytical procedures, it is desired to always produce an increasing output so that only positive peaks can be recorded, polarity switch 235 is linked by suitable circuitry to polarity bias circuit 214. Referring again to FIG. 7, assuming at the beginning of an analysis the Channel 1 and Channel 2 mixers are producing an output with a phase offset of $\phi°$ as shown in FIG. 7. The output at either terminal $a$ or terminal $b$ of the phase meter would correspond to point X or X', respectively, on lines $a$ and $b$ in FIG. 7.

In gas chromatography, light carrier gases, e.g., helium are often employed. Thus, normally an analysis would be proceeding using the output from terminal $a$ since this output increases with increasing phase shift which is most commonly encountered by elution of heavier components in a lighter carrier gas. However, if during the analysis, a negative peak, or a decreasing phase shift, is expected as, for example, would be caused by elution of a hydrogen component of a sample when using helium as a carrier gas, the decreasing phase differential would produce a decreasing phase meter output voltage out of terminal $a$ (traveling down line A to the left, and after a jump increase in voltage at 0° phase differential a continuing decreasing voltage out of terminal $a$. However, the output from terminal $b$ is increasing with decreasing phase shift. Since this is more desirable in most cases, the analyst would prefer to utilize the terminal $b$ output to record a "negative peak." To avoid the base line shift which would result from switching polarity switch 235 to terminal $b$ and instantaneously increasing the phase meter output to point X' on the graph, the polarity bias circuit is employed. Polarity bias circuit 214 throws in a phase offset of $2\Delta\phi$ into the system; and the polarity bias circuit is ganged with the polarity switch 235 as indicated at 236 to automatically offset the outputs from the channels by this amount, i.e., $2\Delta\phi$, concurrently with the switching of the polarity switch 235 from terminal $a$ to terminal $b$. Accordingly, this means that the steady state position on the graph is transferred from point $x$ to point $y$ and accordingly, a further decrease in phase will result in an increase in output of the phase meter without a base line shift.

The use of the 360° phase meter as provided above provides a unidirectional response with discontinuities at the critical points of 360° phase shift. This results in a "foldover" effect in the output. It is generally desirable for analytical purposes to produce unitary peaks without discontinuities to permit integration or the like. Therefore, the discontinuous output of the phase meter 225 is extended by phase range extender 240. The output from phase polarity switch 235 travels through line 238 to a pair of inverting amplifiers 241 and 242. The output of these two amplifiers after passing through low pass filters 243 and 244 is shown schematically at 290 in FIG. 6. The schematic representation in 290 represents a twice-folded peak representing a phase shift of somewhat over 720°. In this regard, it may be seen that the output of the phase meter "folded over" or jumped back to zero twice during the increasing of the phase, and then folded twice as the phase shift returned to zero during the passage of a component of sample through a sound cell. The schematic representation in solid outline in the upper portion of 290 represents the signal as it appears in the output of one of the low pass filters 243 or 244. The graph in dotted outline would then represent the output in the line from the other low pass filter. Both of these signals are then differentiated to produce spike responses at the foldover points. If, for example, the graphic illustration shown in solid outline is the output of low pass filter 243, the output of differentiator 245 would comprise two negative spikes corresponding to the first two foldovers and two positive spikes corresponding to the second two foldovers. An opposite spike signal would be received from differentiator 246 which differentiates the signals shown in dotted outline in 290. These differentiated signals are fed to bidirectional binary counter 247 adapted to count only positive pulses. Thus, if the counter at 292 responds to the positive pulses from differentiator 246 to count upwardly, and at 291 the counter responds to the positive pulses from differentiator 245 to count downwardly a digital counting of the foldovers upwardly during increasing phase and downwardly during decreasing phase is effected. The output of bidirectional counter 247 is fed to digital-to-analog converter 248 which includes a number of summing resistors which produces an analog signal and at any instant corresponding to the number of foldovers being experienced at the phase meter output. Accordingly, the bidirectional counter in the digital-to-analog converter count only foldovers and produce a signal corresponding to the number of foldovers. The five connectors 295 from bidirectional binary counter 247 indicate a capability to count up to 25 or 32 foldovers in the embodiment illustrated. A higher or lower counting capability may be provided as desired.

The output from polarity switch 235 also is taken through line 237 to point 239 where it is added to the voltage output of the digital to analog converter 248. The summed voltages from point 239 are fed into an amplifier 250, the voltage gain of which is determined by feedback resistors in bank 252 which are switched in with switch 251. The resistors in bank 252 operate to select the gain of amplifier 250 which operates as an operational amplifier to extend the dynamic range of the output to accommodate a phase change of up to 32 foldovers in a single peak consistent with the counting ability of counter 247. By suitable enlargement of the bank, a larger number of foldovers may be accommodated if such is desired and necessary and a corresponding change should be made in counter 247. In operation, the output of phase meter 225 taken in line 237 might vary from, for example, zero to ten volts over the range of zero to 360° phase shift. Switch 251 together with amplifier 250 serve to extend the dynamic range such that if the X4 resistor were switched in the output at point 259 after amplifier 250 would vary from zero to ten volts over the range of zero to 1340° phase shift (4×360°).

Capacitor 253 is provided across amplifier 250 to provide for input averaging. Capacitor 253 serves to filter the pulse and prevent saturation of the amplifier at peak voltage.

Output bias 249 merely serves to bias the output signal in any manner desired to accommodate the recorder and/or bias up to the D.C. output is desired. The output from amplifier 250 is then fed through resistor 266 which together with resistor 267 serve as a potential divider to divide voltage output of amplifier 259 to provide a reduced voltage across points 269. Suitably, the recorder 280 employed may be a millivolt full scale potentiometric recorder and accordingly the voltage input across points 269 into the recorder attenuator 261 is conveniently stepped down to about 1 volt.

Output attenuator resistance 261 is a variable resistance or a bank of resistance to enable full scale deflection of the recorder at a selected input voltage. Thus, if the voltage across points 269 can vary from zero to one volt, attenuator 261 on a millivolt recorder will provide attenuation of up to about 1000 so that the 1 volt input to the recorder may be read full scale. Alternatively, when peaks through the sound cells result in millivolt potentials across points 269, attenuator 261 may be adjusted to again provide full scale deflection at 1 millivolt input voltage.

Output filter 263 minimizes high frequency noise encountered under the most sensitive measurement conditions. The filter is illustrated as having three positions to three capacitors to provide different amounts of filtering.

The circuitry discussed above and set forth in the drawings is deemed to represent an embodiment only of the novel phase measurement and conditioning system of this invention. It will be understood that functions equivalent to those of the conditioning system of the invention may be performed using different circuits components. For example, phase range extension may be accomplished by feeding the output of the phase meter to a gate which detects ascending and decending phase difference. The gate can be adapted to switch to one unidirectional binary counter which counts "up" during increasing phase, and then switch to a second unidirectional binary counter to count "down" during decreasing phase. The outputs of each can be fed to different digital-to-analog converters, the outputs of which are combined in a summing amplifier such as discussed above. Other methods for accomplishing phase range extension may also be employed consistent with this invention.

In accordance with the embodiments illustrated and the invention disclosed herein, there is here provided a novel sound cell, a novel header assembly and a novel output conditioning circuit which in combination provide a novel acoustic analytical system.

What is claimed is:

1. A sound cell suitable for use in the analysis of fluids comprising:
   a body having an inlet port and an outlet port communicating with an axial sound cavity for the fluid to be analyzed;
   end pieces disposed at opposite ends of said cavity for sealing said cavity;
   a transmitting piezoelectric transducer and a receiving piezoelectric transducer disposed in said cavity;
   mounting means extending into said cavity from said end pieces for holding said transmitting and said receiving piezoelectric transducers in acoustically communicating relation comprising sharp-edged lips for making substantially linear contact with the acoustic faces of said transmitting and said receiving piezoelectric transducers;

gas port means in said mounting means for conducting the fluid entering said inlet port behind said transmitting and receiving transducers to equalize the pressure on both sides of said transducers;

channel means at each end of said sound cell conducting said fluid from behind said transmitting and said receiving transducers, said channel directing said fluid to sweep the seal between said body and each of said end pieces; and means recombining the fluid from said channels and conducting said fluid to said exit port.

2. The sound cell of claim 1 wherein means are provided to bias said transmitting and said receiving transducers against said sharp-edged lip.

3. The sound cell of claim 1 wherein said inlet port enters said axial sound cavity at the mid-point thereof between said end pieces permitting said fluid flowing into said inlet to split and flow in mirror image flow paths through said ports and said channels at each end of said cell.

4. The sound cell of claim 1 wherein said body, said end pieces and said mounting means are substantially all-metal construction.

5. The sound cell of claim 1 in combination with means to maintain the fluid in said cavity under elevated pressure.

6. A sound cell apparatus suitable for use in analysis of a fluid which comprises:
means defining a cavity for the fluid to be analyzed;
two piezoelectric transducers, each having an acoustic face and an electrode face, disposed in said cavity in acoustically transmitting and receiving relation;
means for mounting said transducers comprising
an annular sharp-edged lip making substantially linear contact with the acoustic face of each transducer proximate the periphery thereof, and
resilient means in contact with the electrode face of the transducer for biasing said transducer against said lip,
said resilient means being the sole means for positioning the transducer against said lip.

7. The sound cell apparatus of claim 6 including:
means to generate an electrical input signal to said transmitting piezoelectric transducer at a preselected frequency of at least one megacycle and at a power level of up to fifty volts.

8. The sound cell apparatus of claim 7 wherein said means generates an electric input signal at a power level of up to ten volts.

9. The sound cell apparatus of claim 8 wherein said transducers have a mechanical Q of less than one hundred.

10. The sound cell apparatus of claim 8 wherein said transmitting and receiving piezoelectric transducers define an acoustic path having a length of up to one inch.

11. The sound cell of claim 6 wherein said resilient means comprise springs disposed against the electrode face of said transducers to make electrical contact with said transducers.

12. The sound cell of claim 6 including fluid port means in said mounting means to permit fluid in said cavity to flow around said transducers to equalize fluid pressure between the acoustic face and the electrode face of said transducers.

13. The sound cell of claim 6 including means for maintaining the fluid within said cavity at an elevated pressure above atmospheric pressure.

14. A sound cell apparatus for analysis of a fluid effluent of a gas chromatograph by measuring the effect of said fluid on an acoustic signal of at least magacycle frequency which comprises:
means defining a cavity for the fluid to be analyzed;
two piezoelectric transducers, each having an acoustic face and an electrode face;
tubular mounting stem means extending into said cavity for mounting said transducers in acoustically transmitting and receiving relation and having inwardly facing sharp-edged lips disposed about the inner periphery of said tubular mounting stem means;
the transducers being positioned within said mounting stem means with a clearance between edge of the transducer and the inner wall of said mounting stem means and with said sharp-edged lips making substantially linear contact with the acoustic faces of said transducers proximate the periphery thereof; and
a resilient means contacting the electrode face of said transducers for biasing said transducers against said lip,
said resilient means being the sole means for positioning said transducers against said lips.

15. The sound cell of claim 14 including:
a substantially all-metal body defining said cavity and having an inlet port and an outlet port communicating with said cavity to permit continuous passage of said fluid through said cavity.

16. The sound cell of claim 14 including:
gas port means in said mounting stem means to permit the fluid in said cavity to flow behind said transducers to equalize fluid pressure between the acoustic face and hte electrode face of said transducers.

17. The sound cell apparatus of claim 14 including:
a body member defining said cavity and having an inlet port and an outlet port communicating with said cavity,
said body member comprising at least two pieces assembled in sealing relationship, and
channel means defined between said pieces to conduct fluid exiting said cavity to sweep the seal between said pieces.

18. The sound cell of claim 14 wherein said transducers have a mechanical Q of less than about one hundred and including:
means to generate an electrical input signal to said transmitting piezoelectric transducer at a preselected frequency of at least one megacycle at a power level of up to ten volts.

References Cited
UNITED STATES PATENTS

| | | | |
|---|---|---|---|
| 2,761,076 | 8/1956 | Hansell | 310—9.1 |
| 2,984,097 | 5/1961 | Kniazuk et al. | 73—24 |
| 3,443,433 | 5/1969 | Liston et al. | 73—194 |

RICHARD C. QUEISSER, Primary Examiner

J. K. LUNSFORD, Assistant Examiner

UNITED STATES PATENT OFFICE
CERTIFICATE OF CORRECTION

Patent No. 3,557,605　　　　　　　　　Dated January 26, 1971

Inventor(s) Keith P. Lanneau et al.

It is certified that error appears in the above-identified patent and that said Letters Patent are hereby corrected as shown below:

Column 2, line 14, "Nobel" should read -- Noble --; line 18 "fuuctionally" should read -- functionally --. Column 4, line 59, "issustrated" should read -- illustrated --. Column 6, lir 50, "oscallator" should read -- oscillator --. Column 7, line 45, "pressure" should read -- pressures --. Column 8, line 2, "produce" should read -- produced --; line 4, "now" should be cancel; line 35, after "are" insert -- then --; line 69, "out" should read -- output --. Column 10, line 16, "megacycls" should read -- megacycles --; line 23, "differentiated" should read -- differential --; line 32, "cir-" should read -- circuit --. Column 11, line 1, after "temperature" insert -- stability --. Column 13, line 33, "explicitely" should read -- explicitly --. Column 16, line 26, "resistance" should read resistances --. Column 18, line 39, "hte" should read -- the -

Signed and sealed this 25th day of May 1971.

(SEAL)
Attest:

EDWARD M.FLETCHER,JR.　　　　　　　WILLIAM E. SCHUYLER, JR.
Attesting Officer　　　　　　　　　Commissioner of Patents